United States Patent [19]
Atkinson et al.

[11] Patent Number: 5,385,790
[45] Date of Patent: Jan. 31, 1995

[54] HEAT SHIELDS

[75] Inventors: Alan W. Atkinson, Barby; David R. Bridge; Alan James, both of Rugby, all of United Kingdom

[73] Assignee: T&N Technology Limited, Warwickshire, United Kingdom

[21] Appl. No.: 59,351

[22] Filed: May 11, 1993

[30] Foreign Application Priority Data

Aug. 21, 1992 [GB] United Kingdom ............... 9217795

[51] Int. Cl.⁶ .................................... B32B 15/00
[52] U.S. Cl. .................................... 428/593; 428/594; 428/76; 428/124; 428/72; 52/807
[58] Field of Search ............... 428/76, 75, 593, 594, 428/68, 72, 126; 52/807

[56] References Cited

U.S. PATENT DOCUMENTS

| | | | |
|---|---|---|---|
| 2,312,987 | 3/1943 | Grassick | 52/807 |
| 4,659,601 | 4/1987 | Elliott et al. | 428/36 |
| 5,011,743 | 4/1991 | Sheridan et al. | 428/600 |

FOREIGN PATENT DOCUMENTS

| | | |
|---|---|---|
| 0439046A1 | 7/1991 | European Pat. Off. |
| 0486427A1 | 5/1992 | European Pat. Off. |
| 9107484 | 10/1991 | Germany . |
| 1300390 | 12/1972 | United Kingdom . |
| 2094947A | 7/1982 | United Kingdom . |
| 2094947 | 9/1982 | United Kingdom . |
| 2196097A | 4/1988 | United Kingdom . |
| 2196098A | 4/1988 | United Kingdom . |

*Primary Examiner*—Alexander S. Thomas
*Attorney, Agent, or Firm*—Nixon & Vanderhye

[57] ABSTRACT

A heat shield (10;40) comprises one or more metal members (14,24;44,46) defining a rigid enclosure (12;42) having a substantially continuous heat-reflecting surface (26 or 32; 50 or 52). The shield also comprises a plurality of sheets (30;48) of smooth flexible metal foil within said enclosure. The sheets are arranged one above the other, extend generally parallel to the heat-reflecting surface, and are free to touch one another.

12 Claims, 1 Drawing Sheet

HEAT SHIELDS

BACKGROUND OF THE INVENTION

This invention is concerned with heat shields, for example heat shields for use in vehicles.

Many vehicles contain significant sources of heat from which it is necessary to shield heat sensitive equipment, cargo, or passengers. For example, passengers in an automobile may need to be shielded from heat generated by an exhaust system, or electrical or electronic components may need to be shielded from heat generated in an engine.

Heat shields used in vehicles must combine good resistance to heat transfer with acceptable acoustic properties, i.e they must not generate significant noise as the vehicle operates. Clearly, such heat shields must also be able to withstand the temperatures to which they are subjected in service. Other desirable properties are lightness, compactness, cheapness and suitability for recycling, i.e. use of readily re-usable materials is preferable especially use of a single such material.

Many heat shields have a substantially continuous heat-reflecting surface designed to reflect radiant heat back towards the heat source. Generally, such surfaces are provided by metal members which can withstand the temperatures experienced and are good reflectors of infra-red radiation. Aluminum or an alloy thereof can be used as it is a particularly good reflector of infra-red radiation and is lighter than, for example, steel. However, as metal is a good conductor of heat, it is necessary to provide such metal members with means for reducing thermal conduction therethrough. Such means may be provided by adding a material with good thermal insulating properties, for example mineral wool. Such material may, however, be expensive, increase the weight of the shield, and reduce its suitability for recycling. An alternative way providing thermal insulation is to create one or more enclosed or partially enclosed air spaces since air is a good thermal insulator. Such air spaces can be created between sheets of metal which are corrugated, or embossed, so that they make only limited contact with one another so that there are insulating air spaces between the contact areas. Such sheets have to be thick enough to have sufficient strength to retain their spacing, i.e. they have to be substantially rigid. Such constructions may, however, be unacceptable acoustically as ringing effects may occur and must have a substantial thickness to allow for the air spaces. An example of a prior art heat shield is described in U.S. Pat. No. 5,011,743 (Sheridan).

The present invention has the object of providing an improved heat shield with good resistance to heat transfer and good acoustic properties.

BRIEF SUMMARY OF THE INVENTION

The invention provides a heat shield for a vehicle comprising at least one metal member defining a substantially rigid enclosure having a substantially continuous heat-reflecting outer surface, and a plurality of sheets of smooth, flexible metal foil within said enclosure, each sheet extending generally parallel to said heat-reflecting surface, the sheets being arranged one above the other and being free to contact one another.

The term "smooth" is used herein to denote a foil which is substantially free from indentations or projections which would limit the contact areas of overlying sheets of the foil. Such a foil, unlike sheets used in prior art heat shields, has not been embossed, corrugated or crumpled to render it rigid enough to maintain well-defined air spaces between adjacent sheets. Such a foil is generally planar before insertion in the enclosure but may adopt an undulating shape in the enclosure due to its flexibility.

A heat shield according to the invention is found to have good resistance to heat transfer because, although there are no well-defined air spaces, air is nevertheless present in the enclosure and acts as an insulator. Furthermore, the interfaces between the sheets of foil provide resistance to heat conduction. Such a heat shield is also found to have good acoustic properties as the flexible sheets do not "ring" and their presence prevents the enclosure from acting like a drum. Such a heat shield is compact, as it does not have to provide depth for well-defined air spaces, and can be made entirely of light, relatively cheap, recyclable metal. The enclosure defines the overall shape of the heat shield, including any curves around components and any fixing points, and serves to protect the sheets of foil.

Preferably, the enclosure is defined by a substantially rigid member defining a recess, and a closure member which closes an opening of said recess. Either a top surface of the closure member or a bottom surface of the substantially rigid member can provide said heat-reflecting surface. The closure member may be made from metal sheet or foil and may be joined to the substantially rigid member by an edge of the closure member being turned over an edge of a rigid member or by the edge of a rigid member being turned over the edge of the closure member. The metal of the rigid member and the closure member may be the same as that of the sheets of flexible foil. Aluminum or aluminum alloy is a suitable metal because of its good heat-reflecting properties. Other materials may, however, be used, e.g. steel with a coating of aluminum thereon.

The rigid member of the enclosure may be formed of material which is between 0.25 and 0.75 mm thick, e.g. 0.46 mm. The foil sheets may be between 1 and 150 microns thick, e.g. 50 microns.

The enclosure may have a depth of between 0.5 mm and 3 mm and may contain 3 or more sheets which may be loose, i.e. not mounted on the enclosure or other sheets or may be secured at one or more edges thereof to the enclosure or to other sheets.

BRIEF DESCRIPTION OF THE DRAWINGS

There now follows a detailed description, to be read with reference to the accompanying drawings, of two heat shields which are illustrative of the invention.

In the drawings.

DETAILED DESCRIPTION OF PREFERRED EMBODIMENTS OF THE INVENTION

Figure 1:
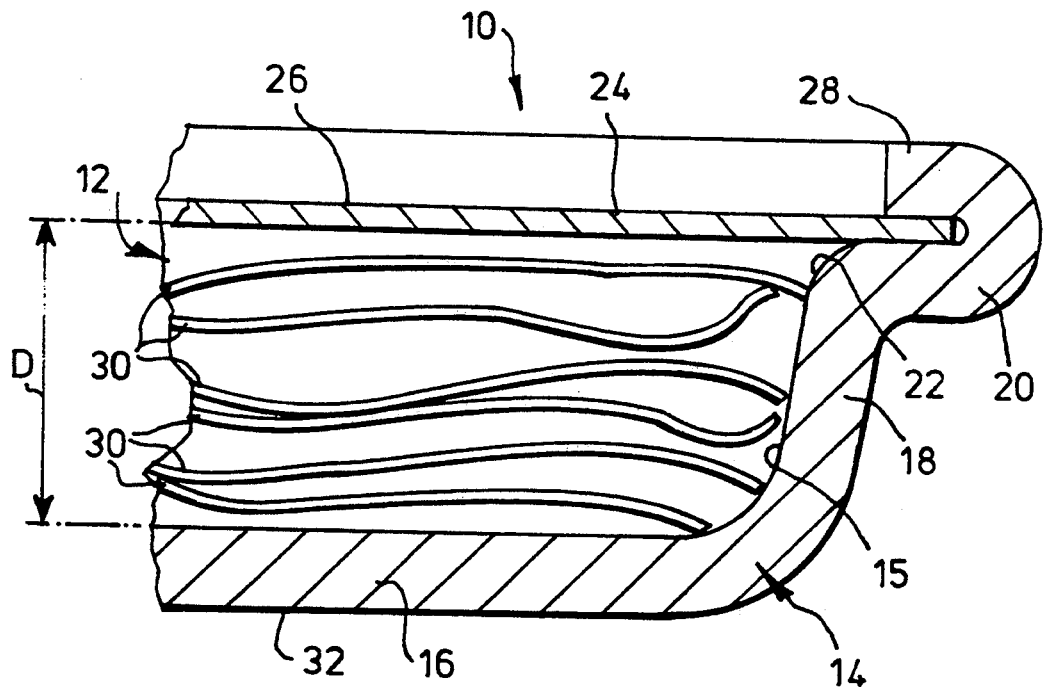
FIG. 1 is an enlarged diagrammatic cross-sectional view taken through a part of a first illustrative heat shield.

The first illustrative heat shield 10 is for a vehicle and comprises two metal members defining a substantially rigid enclosure 12. These metal members comprise a substantially rigid member 14 made of sheet aluminum alloy approximately 0.46 mm thick. The member 14 defines a recess 15 having a bottom 16 which is shown as substantially planar but may be shaped to a required curved shape, upwardly inclined side walls 18, and a lip 20 defining an opening 22 of the recess 15. The lip 20 projects from the walls 18 away from the recess 15 generally parallel to the bottom 16. The metal members defining the enclosure 12 also comprise a closure member 24 which closes the opening 22 and provides a substantially continuous heat-reflecting upper surface 26 of the enclosure 12. The closure member 24 is made of aluminum alloy foil and is stretched across the opening 22. The closure member 24 is secured to the member 14 by engaging the lip 20 around the opening 22 and being held in that position by overturned edges 28 of the lip 20. However, in other constructions, the edge of the member 24 may be welded or otherwise secured to the lip 20.

The enclosure 12 is, in this case, generally rectangular when viewed in plan (not shown) but it can be made to any desired shape. It has its length and breadth vastly greater than its depth D which is defined as extending from the upper surface of the bottom 16 to the lower surface of the closure member 24. In this case, the depth is 2 mm.

The heat shield 10 also comprises a plurality of sheets of flexible smooth metal foil 30 within the enclosure 12. Each of these sheets 30 is made of aluminum alloy and is approximately 50 microns in thickness. In this case, there are 6 sheets 30 which are arranged one above the other in the enclosure 12 so that they extend generally parallel to the surface 26. The sheets 30 each have the plan shape of the bottom 16 so that the entire area within the walls 18 is covered by the sheets 30. The sheets 30 are not secured to the members 14 or 24, although, in variations of the illustrative heat shield 10, they may be so secured, e.g. by having edges which are trapped by the overturned edges 28. The sheets 30 are also not secured to one another, although, in variations of the heat shield 10, they may be so secured at at least one edge thereof, e.g. by staples, so that the 6 sheets can be positioned as a unit in the recess 15 defined by the member 14. The sheets 30 are free to touch one another, i.e. they have nothing between them except air and rest against one another in small areas as shown in the drawing. Because of their flexibility, the sheets 30 touch each other over undefined areas but some air is trapped between them. The foil of the sheets 30 is intended to be entirely planar when introduced into the recess 15, except possibly for some accidental creasing or crumpling. The foil has not been deliberately crumpled, corrugated or embossed but, due to its flexibility, adopts undefined hollows and bumps in the recess 15 as shown in the drawing.

The heat shield 10 is intended to be used with the surface 26 facing the heat source. It may, however, be used with the lower surface 32 of the member 14 facing the heat source. The surface 26, which is made of a good reflector of infra-red radiation and reflects a proportion of the radiation back towards the heat source. Heat which is absorbed by the closure member 24 in passing through the heat shield 10 has to overcome the heat reflecting effect of the upper surfaces of the sheets 30 and of the bottom 14, has to pass across interfaces between the sheets 30 and the members 14 and 24, and has to overcome the insulating effect of trapped air.

The heat shield 10 is found to have satisfactory resistance to heat transfer, although this resistance is not as good as that of a completely empty enclosure which, however, does not have satisfactory acoustic properties. The acoustic properties of the heat shield 10 are, however, also satisfactory, the damping factor being found to be approximately 0.25 as compared to approximately 0.15 for the empty enclosure 12. The heat shield 10 is also light, relatively cheap, and can readily be recycled since it is entirely made of aluminum alloy.

Figure 2:
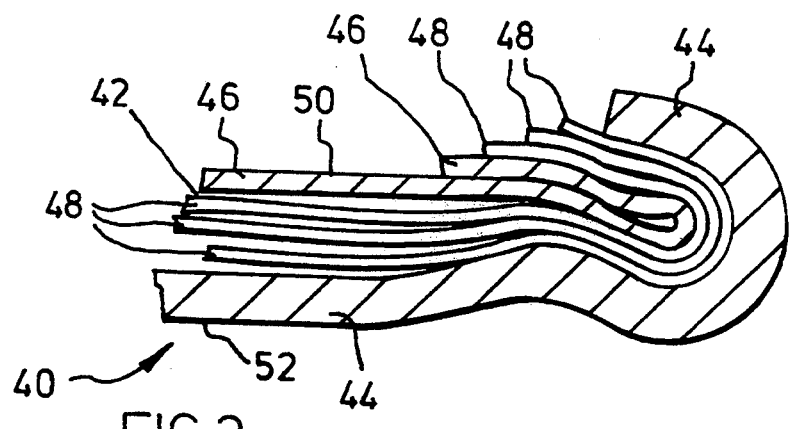
FIG. 2 is a view similar to FIG. 1 but of a second illustrative heat shield.

FIG. 2 shows the second illustrative heat shield 40 which comprises two metal members defining a substantially rigid enclosure 42. These metal members are both made of aluminum alloy and comprise a substantially rigid member 44 and a closure member 46. The shield 40 also comprises three sheets of smooth flexible foil 48.

The shield 40 is formed by forming a stack with the member 44 at the bottom, the member 46 at the top, and the sheets 48 one on top of the other between the members 44 and 46. The edges of the stack are then bent upwardly so that the member 44 forms a recess closed by the closure member 46. Next, the edges of the stack are pinched and bent over so that the stack is held together by the compressed and bent over edges.

At the edges of the shield 40, the sheets 48 are tightly compressed between the members 44 and 46 but, away from these edges, the sheets 48 are free to touch one another but some air is trapped between them. The sheets 48, therefore, although initially planar adopt undefined hollows and bumps in the enclosure 42.

The upper surface 50 of the member 46 or the lower surface 52 of the member 44 provide alternative continuous heat-reflecting surfaces and the sheets 48 extend generally parallel to these surfaces 50 and 52.

The member 44, and to an extent the member 46, give the shield 40 rigidity and can be moulded to any required shape, e.g. to wrap it around or partially around a heat source.

We claim:

1. A heat shield for a vehicle comprising at least one metal member defining a substantially rigid enclosure having a substantially continuous heat-reflecting outer surface, and a plurality of sheets of smooth flexible metal foil within said enclosure, all said sheets extending generally parallel to said heat-reflecting surface and being substantially free of indentations or projections which would limit the contact areas of overlying sheets of the foil, the sheets being arranged one above the other and being free to contact one another over substantially the entire area of the shield.

2. A heat shield according to claim 1, wherein said enclosure is defined by a substantially rigid metal member defining a recess, and a closure member which closes an opening of said recess.

3. A heat shield according to claim 2, wherein the closure member is made of metal foil.

4. A heat shield according to claim 2, wherein the closure member is secured to the rigid member by overturned edges.

5. A heat shield according to claim 1, wherein the metal foil is between 1 and 150 microns thick.

6. A heat shield according to claim 1, wherein the depth of the enclosure is between 0.5 and 3.0 mm.

7. A heat shield according to claim 1, wherein there are at least 3 sheets of the smooth, flexible foil.

8. A heat shield according to claim 1, wherein the smooth, flexible metal foil is made of aluminum.

9. A heat shield according to claim 1, wherein the smooth flexible metal foil is made of an alloy of aluminum.

10. A heat shield according to claim 1, wherein the enclosure is made of aluminum.

11. A heat shield according to claim 1, wherein the enclosure is made of an alloy of aluminum.

12. A heat shield according to claim 1, wherein the sheets of foil are joined at at least one edge thereof to the enclosure.

* * * * *